United States Patent [19]

Morimoto

[11] 4,131,926

[45] Dec. 26, 1978

[54] MAGNETIC TAPE AND RECORDING METHOD THEREFOR

[75] Inventor: Toshio Morimoto, Hirakata, Japan

[73] Assignee: Matsushita Electric Industrial Co., Ltd., Kadoma, Japan

[21] Appl. No.: 689,147

[22] Filed: May 24, 1976

[51] Int. Cl.² .............................................. G11B 5/78
[52] U.S. Cl. .................................................. 360/134
[58] Field of Search ................. 360/134, 132, 69–78, 360/137, 55

[56] References Cited
U.S. PATENT DOCUMENTS 3,781,490  12/1973  Phillips ................................. 360/78

OTHER PUBLICATIONS

Feldman, "New For Hi-Fi," Radio–Electronics, p. 48+, Oct. 1976.

Primary Examiner—Robert S. Tupper

[57] ABSTRACT

A magnetic tape for use in a recording and reproduction apparatus of signal information and recording method therefor, in which at least two main signal tracks are formed, in spaced relation to each other, adjacent to opposite side edged with respect to the longitudinal central axis of the magnetic tape, with at least two auxiliary signal tracks being formed in the space between the main signal tracks. The auxiliary signals related to one of the main signal tracks are recorded on one of the auxiliary signal tracks arranged nearer the other of the main signal tracks, and the auxiliary signals related to the other of the main signal tracks are recorded on the auxiliary signal track arranged nearer the one of the main signal tracks for stable reproduction.

4 Claims, 4 Drawing Figures

MAGNETIC TAPE AND RECORDING METHOD THEREFOR

The present invention relates to a magnetic recording tape and more particularly, to an improvement of a multi-track magnetic recording tape and recording method therefor.

Magnetic recording tapes of various types have widely been employed for recording and reproduction of various information signals, for example, of sound signals or the like, with known tape recording and reproducing apparatuses including reel drive controls, mountings, recording and reproducing magnetic heads, electrical circuits coupled thereto and other necessary arrangements, one example of which tape recording and reproducing apparatuses being detailed, for example, in U.S. Pat. No. 3,330,915.

In such conventional magnetic recording tapes, main signals such as message signals, and auxiliary signals, for example, programming signals are recorded on particular tracks on the tape in a manner as described hereinbelow with reference to FIGS. 1 and 2 showing fragmentary views of the conventional magnetic recording tapes. In the prior art magnetic tape of FIG. 1, the magnetic tape T is divided, at its longitudinal central axis, into two portions, i.e., sides a and b, on which side a, two main signal tracks ta and tb for use during running of the tape T in a direction of an arrow A are formed, while two similar main tracks ta' and tb' are formed on the side b for use when the tape T is running in a direction opposite to the arrow A, with an auxiliary signal track s which has signals related to the two sets of the main signal tracks ta and tb, and ta' and tb' being formed along the longitudinal central axis of the tape T. The conventional magnetic recording tape of the above construction has various disadvantages in that since auxiliary signals for controlling the main signals of the two sets of the tracks ta and tb, and ta' and tb' and other control signals related thereto are recorded on the single auxiliary signal track s, these auxiliary signals must be discriminated from each other for enabling control related to the respective main signals, thus resulting not only in complication of associated recording and reproduction apparatuses with consequent high cost thereof, but in increased possibility of malfunction of such aparatuses. On the other hand, in another magnetic recording tape of known construction shown in FIG. 2, the auxiliary signal track s described as employed in the arrangement of FIG. 1 is replaced by two separate auxiliary signal tracks sa and sb, one track sa of which is formed outside the main signal tracks ta and tb, i.e., in a position adjacent to and along the side edge of the side a, while the other track sb is formed outside the main signal tracks ta' and tb', i.e., in a position adjacent to and along the side edge of the side b of the magnetic tape T. The conventional magnetic tape of the above construction, although discrimination of the auxiliary signals at the apparatus side as required in the tape of FIG. 1 is not necessary, also has serious disadvantages in that erroneous functioning of the recording and reproducing apparatuses tends to be caused due to unstable recording of the auxiliary signals or decreased recording level through possible damage to the side edges of the magnetic tape T or insufficient contact of the same with a magnetic head (not shown) during running of the tape T. Furthermore, in the magnetic tape of the above described type, since the main signal tracks are very closely arranged to the respective auxiliary signal tracks, it is extremely difficult, from a technical point of view, to constitute cores (not shown) for the main signals and auxiliary signals in an in-line type package in the manufacture of magnetic heads, with consequent high cost of the related recording and reproduction apparatuses.

Accordingly, an essential object of the present invention is to provide a magnetic tape and recording method therefor wherein at least two sets of main signals and auxiliary signals related thereto are recorded on the magnetic tape, which are capable of stable recording and reproduction of the respective signals, with substantial elimination of disadvantages inherent in the conventional magnetic recording tape and recording method therefor.

Another important object of the present invention is to provide a magnetic tape of the above described type and a recording method therefor which are free from malfunction during reproduction irrespective of possible damage at side edges of the magnetic tape.

A further object of the present invention is to provide a magnetic tape of the above described type and a recording method therefor wherein recording and reproduction of the signals can be effected through employment of inexpensive magnetic heads of simple construction, with consequent low cost of the related recording and reproduction apparatuses.

According to a preferred embodiment of the present invention, the magnetic recording tape made of known materials is provided with two auxiliary signal belts or tracks formed at the central portion of the tape along its longitudinal axis, while at least two main signal tracks are formed adjacent to opposite side edges of the same tape respectively, with the auxiliary signal tracks arranged therebetween so that auxiliary signals related to signals of the main signal tracks at one side of the tape are recorded on the auxiliary signal track separated by the auxiliary signal track related to the signals of the main signal tracks at the other side of the tape, by which arrangement, disadvantages inherent in the conventional magnetic tapes such as malfunction of the apparatuses through uncertain recording of the auxiliary signals or reduction of the signal level thereof due to damage done to the tape side edges or due to insufficient contact of the tape with the magnetic heads during running of the tape etc. are advantageously eliminated.

These and other objects and features of the present invention will become apparent from the following description taken in conjunction with the preferred embodiment thereof with reference to the attached drawings in which.

Before the description of the present invention proceeds, it is to be noted that like parts are designated by like reference numerals throughout the views of the accompany drawings.

Figure 1:
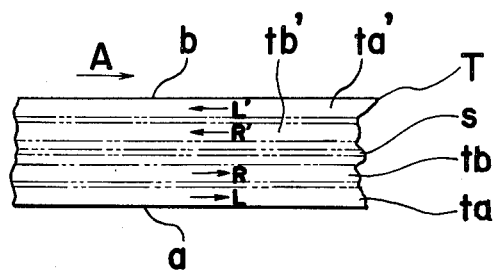
FIGS. 1 and 2 are fragmentary views of conventional magnetic recording tapes.
Figure 2:
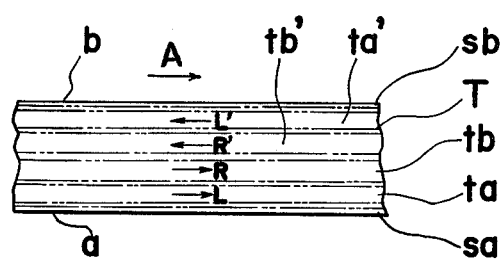
Figure 3:
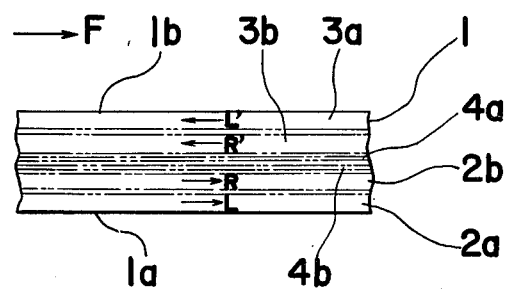
FIG. 3 is a fragmentary view of a multi-track magnetic recording tape showing the arrangement of main signal tracks and auxiliary signal tracks thereof according to the present invention.

Referring now to FIG. 3, there is shown a magnetic recording tape of the invention. The magnetic tape 1 is divided, at its longitudinal central axis, into two portions 1a and 1b, on which portion 1a, two main signal tracks 2a and 2b are formed in spaced relation to each other and in parallel to the side edge of the portion 1a for use during running of the tape 1 in a direction of an arrow F, while on the portion 1b, corresponding two main signal tracks 3a and 3b are formed, in the similar manner as in the tracks 2a and 2b described above, for use during running of the tape 1 in a direction opposite to that indicated by the arrow F. Between the two sets of the main signal tracks 2a and 2b, and 3a and 3b, i.e., between the inner tracks 2b and 3b, there are formed two auxiliary signal tracks 4a and 4b in parallel with said main signal tracks and in spaced relation to each other along the longitudinal central axis of the tape 1. The auxiliary signals related to the main signals recorded on the main tracks 2a and 2b are recorded on the auxiliary signal track 4a adjacent to the main track 3b, while the auxiliary signals related to the main signals recorded on the main tracks 3a and 3b are recorded on the auxiliary signal track 4b adjacent to the main track 2b with the use of suitable recording and reproducing apparatuses (not shown) having corresponding magnetic heads associated with means for recording the signal information on the magnetic tape and for reproducing the recorded signal information therefrom. Such recording and reproducing apparatuses are conventional, and one example of construction and function of recording and reproduction apparatuses of the kind is described in U.S. Pat. No. 3,330,915 patented July 11, 1967.

In the above arrangement, since the auxiliary signals related to the signals of the main tracks at one side of the tape are recorded on the auxiliary signal track separated by the auxiliary signal track related to the signals of the main tracks at the other side of the tape, cross talk between the main signals and the auxiliary signals is minimized. Furthermore, the formation of the auxiliary signal tracks 4a and 4b at the central portion of the tape 1 is effective not only for eliminating the disadvantages in the conventional magnetic tapes that the auxiliary signal tracks formed adjacent to the side edges of the tape are adversely affected by possible damage to such side edges during running of the tape, but also for the increasing distance between a main signal core and an auxiliary signal core of the magnetic heads, thus facilitating manufacture of magnetic heads for the recording and reproduction apparatuses. Additionally, since the auxiliary signal tracks 4a and 4b are formed in the central portion of the magnetic tape 1 whereat the tape 1 contacts the magnetic heads most closely and stably, the auxiliary signal level obtained therefrom is sufficient to eliminate any malfunction of the associated apparatuses even when the auxiliary signals recorded are at a level lower than that of the main signals, thus stable control of functioning of such apparatuses being made possible.

It should be noted here that the magnetic tape of the invention is not limited in its application to recording and reproduction of sound signals alone, but that the main signal tracks 2a and 2b, and 3a and 3b may be used for recording any signal information, for example, message signals, information signals or the like, while the auxiliary signal tracks 4a and 4b may, for example, have recorded thereon single signals for cue purpose, bit signals for address signals or the like, depending on the requirements.

Figure 4:
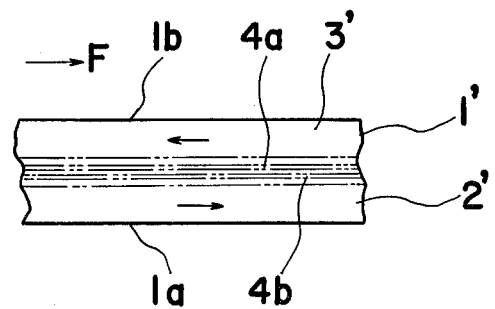
FIG. 4 is a view similar to FIG. 3, but particularly shows a modification thereof.

Referring now to FIG. 4, there is shown a modification of the magnetic recording tape of FIG. 3. In this modification, the main tracks 2a and 2b, and 3a and 3b described as formed in the magnetic tape 1 of FIG. 3 are replaced by single main tracks 2' and 3', respectively, representing the so-called monaural arrangement. The remainder of the construction and function of the magnetic tape 1' of FIG. 4 including the formation of the auxiliary signal tracks 4a and 4b in the central portion of the tape 1' are similar to those of the magnetic recording tape 1 of FIG. 3, so that a detailed description thereof is omitted for brevity.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A magnetic tape for use in a recording and reproducing apparatus having means for recording signal information on the magnetic tape and for reproducing the recorded signal information therefrom, said magnetic tape comprising at least two main signal tracks of main information signals and positioned in spaced relation to each other and in positions adjacent to opposite side edges of said magnetic tape with respect to the longitudinal central axis of said magnetic tape, and at least two auxiliary signal tracks of auxiliary control signals positioned in the space between said two main signal tracks, the auxiliary control signals related to the main information signals of one of said main signal tracks being recorded only on the one of said auxiliary signal tracks positioned nearer the other of said main signal tracks, and the auxiliary control signals related to the main information signals of the other of said main signal tracks being recorded only on the auxiliary signal track positioned nearer said one of said main signal tracks.

2. A magnetic tape as claimed in claim 1, wherein each of said two main signal belts has a single signal track.

3. A magnetic tape as claimed in claim 1, wherein each of said two main signal belts has dual signal tracks.

4. A method for recording signal information on a magnetic tape for use in a recording and reproducing apparatus at least having means for recording the signal information on the magnetic tape, said method comprising the step of recording main information signals on at least two main information signal tracks on said tape, said main information signal tracks being in spaced relation to each other and in positions adjacent to opposite side edges of said magnetic tape with respect to longitudinal central axis of said magnetic tape, and the step of recording auxiliary control signals on at least two auxiliary information signal tracks on said tape, said auxiliary control signal tracks being in the space between said two main signal tracks, auxiliary control signals related to the main information signals of one of said main signal tracks being recorded onto the one of said auxiliary information signal tracks positioned nearer the other of said main information signal tracks, and the auxiliary control signals related to the main information signals of the other of said main information signal tracks being recorded onto the auxiliary information signal track positioned nearer said one of said main information signal tracks.

* * * * *